United States Patent
Raman et al.

(10) Patent No.: US 11,853,393 B2
(45) Date of Patent: Dec. 26, 2023

(54) METHOD AND SYSTEM FOR GENERATING SYNTHETIC DOCUMENTS FOR LAYOUT RECOGNITION AND INFORMATION RETRIEVAL

(71) Applicant: JPMorgan Chase Bank, N.A., New York, NY (US)

(72) Inventors: Natraj Raman, London (GB); Sameena Shah, Scarsdale, NY (US); Manuela Veloso, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 95 days.

(21) Appl. No.: 17/643,490

(22) Filed: Dec. 9, 2021

(65) Prior Publication Data

US 2023/0147778 A1    May 11, 2023

Related U.S. Application Data

(60) Provisional application No. 63/263,842, filed on Nov. 10, 2021.

(51) Int. Cl.
*G06F 18/214* (2023.01)
*G06V 30/413* (2022.01)
(Continued)

(52) U.S. Cl.
CPC ........ *G06F 18/2148* (2023.01); *G06F 16/383* (2019.01); *G06F 18/29* (2023.01);
(Continued)

(58) Field of Classification Search
CPC ........... G06V 30/40–42; G06V 30/413; G06V 30/414; G06V 30/416; G06F 18/2148; G06F 18/383; G06F 18/29
See application file for complete search history.

(56) References Cited

U.S. PATENT DOCUMENTS

| | | | |
|---|---|---|---|
| 2019/0156115 A1* | 5/2019 | Cohen | G06N 3/08 |
| 2021/0158093 A1* | 5/2021 | Kaynig-Fittkau | G06V 10/82 |

OTHER PUBLICATIONS

Souafi-Bensafi et al., "A probabilistic approach to digest/table of contents recognition" (published in Traitement du Signal, vol. 22, No. 3, pp. 191-208) (Year: 2005).*

(Continued)

*Primary Examiner* — Casey L Kretzer
(74) *Attorney, Agent, or Firm* — GREENBLUM & BERNSTEIN, P.L.C.

(57) ABSTRACT

A solution to identify the layout elements in a document is provided. The documents are formulated in an integrated visual space, where they are treated uniformly as a rasterized image. The transformation to image space facilitates exploitation of a spectrum of stylistic cues, such as spacing between the lines and paragraphs. Effective recognition of layout elements is provided by applying a synthetic generator model that creates artificial documents with the required labels and bounding boxes. The generator model is based on a Bayesian Network, offers full flexibility in controlling the document types and labels, and can introduce artificial defects to synthesize low-quality documents. An artificial intelligence model for detecting layouts is trained based on these synthetic documents and the resultant model is used to identify the layout elements in real-world documents. The resulting layout elements, when augmented with the text content, greatly aids in effective information retrieval.

14 Claims, 17 Drawing Sheets

(51) Int. Cl.
*G06V 30/416* (2022.01)
*G06V 30/414* (2022.01)
*G06F 16/383* (2019.01)
*G06F 18/20* (2023.01)

(52) U.S. Cl.
CPC .......... *G06V 30/413* (2022.01); *G06V 30/414* (2022.01); *G06V 30/416* (2022.01)

(56) References Cited

OTHER PUBLICATIONS

Moghaddam et al., "Low quality document image modeling and enhancement" (published in International Journal of Document Analysis and Recognition (IJDAR), vol. 11, pp. 183-201) (Year: 2009).*

* cited by examiner

Castro's reforms ? ? Disapproval of the meeting was based largely on the belief that the timing could hardly be worse. It was the only thing in his life for which he felt guilt. Milk secured Barro's photograph from the gentleman in charge, rushed to the Hollywood police station to report the theft, and less than five minutes later, detectives with his picture in hand were on the trail of Cal Barro. The welfare of citizens, old and young, is the responsibility a lot here lately, and I figgered I might as well's try it.

From being a hated tyrant and madman he was now the symbol of all that was noblest and best in the history of Sweden. " It doesn't seem quite right, telling her a thing like that It was as if they could hardly wait to get into their costumes, cover their faces with masks and go adventuring. The koinonia of Acts and of the Epistles means sharing in a common relation to Christ. These theoretical relationships are more clearly illustrated in Fig. 7 and of friends, then as always.

Where Acheson had fought a gallant losing battle for the Department, Dulles fed the crocodile with his subordinates. The slave is owner. And ever was. Student religious committee of the Carleton Student Association.

A unified concept can serve as a guide to budgeting and, if public support is gained will command Congressional support. But these sources have not been tapped. The task in the governor's office.

Irreverent Asset Shortbarrel

2 She Told The Sheep , ' The World Is Coming To An End ' ! ! In This Bomber Feuds as I understand it, Mr. Hammarskjold wanted outside advice. This is the force, in our time and in every other time, that urges the paranoiac and the manic-depressive to become head of a state. Who wants this deed done " ? ? Such planning will require the cooperation of other occupants and of the apartment management. No matter that the Katanga operation strategically insane in terms of Western interests in Africa.

but even laissez-faire was a conscious policy. Tilghman kept on to him, dragged him upright and hit him again, this time sending him careening against the bar. Cut bevel edge on the long sides of clay at a 45-degree angle to miter corners. He did not ! ! I mean she's still living, and she's ninety-six. Such classifications may be called " somewhat advanced" or " somewhat delayed ", as the case may be, reserving " moderate " for dots upon on tinge to the mean.

4 Periclean Newlyweds Menas Funerals had been given about half his legacy to use in a business venture before Papa's death shouted heartily. What is the common man's complaint ? ?Pets became sad and moody.

for getting a share of the American bounty, the secret of the invitation to dinner. Here the Architect, referring to the use of the

Castro's reforms ? ? Disapproval of the meeting was based largely on the belief that the timing could hardly be worse. It was the only thing in his life for which he felt guilt Milk secured Barco's photograph from the gentleman in charge, rushed to the Hollywood police station to report the theft, and less than five minutes later, detectives with his picture blazed were on the trail of Cal Barco. The welfare of citizens, old and young, is the responsibility a lot here lately, and I figured I might as well's try it.

From being a hated tyrant and madman he was now the symbol of all that was noble and best in the history of Sweden." It doesn't seem quite right, telling her a thing like that It was as if they could hardly wait to get into their costumes, cover their faces with masks and go adventuring. The koinonia of Acts and of the Epistles means sharing in a common relation to Christ. These theoretical relationships are more clearly illustrated in Fig. 7 and of friends, then as always.

Where Acheson had sought a gallant losing battle for the Department, Dulles is the crocodile with his subordinates. The slave is owner. And ever was. Student religious committee of the Carleton Student Association.

A unified concept can serve as a guide to budgeting and, if public support is gained will command Congressional support. But these sources have not been tapped. The below the governor's office.

Irreverent Asset Shortbarrel

2 She Told The Sheep, ' The World Is Coming To An End ' ! ! In This Bomber Feuds as I understand it, Mr. Hammarskjold wanted outside advice. This is the force, in our time and in every other time, that urges the paranoiac and the manic-depressive to become head of a state. Who wants this thing done ? ? ? Such planning will require the cooperation of other occupants and of the apartment management. No matter that the Katanga operation strategically insane in terms of Western interests in Africa.

but even language was a conscious policy. Tilghman leapt on to him, dragged him upright and hit him again, this time sending him careening against the bar. Cut been lodged on the long sides of clay at a 43-degree angle to miter corners. He did not ! ! I mean she's still living" and she's ninety-six. Such classifications may be called " somewhat advanced" or " somewhat delayed ", as the case may be, reserving " moderate " for dots upon or close to the mean.

4 Periclean Newlyweds Menas Funerals

Frank had been given about half his legacy to use in a business venture before Papa's death ; " Infectious hepatitis ", he shouted heartily. What is the common man's complaint ? ? Pete frowned slightly, then became sad and moody.

Here are hatched plans for getting a share of the American bounty, the secret of the anti-missile missile, or an invitation to dinner. Here the Architect, referring to the use of the Capitol as a public building, not a museum, requested some repainting to maintain coming at him from the east, the pickup truck from the west.

3 Recitals Cautions Aberrations Wornout Cerulean

Instructor Lawn Compliance

METHOD AND SYSTEM FOR GENERATING SYNTHETIC DOCUMENTS FOR LAYOUT RECOGNITION AND INFORMATION RETRIEVAL

CROSS-REFERENCE TO RELATED APPLICATIONS

This application claims priority benefit from U.S. Provisional Application No. 63/263,842, filed Nov. 10, 2021, which is hereby incorporated by reference in its entirety.

BACKGROUND

1. Field of the Disclosure

This technology generally relates to methods and systems for retrieving information from documents by recognizing layouts thereof, and more particularly to methods and systems for generating synthetic documents and using machine learning algorithms that are trained with the synthetic documents to perform layout recognition and information retrieval from real-world documents.

2. Background Information

Information retrieval from text documents is an important use case across many business problems. Traditionally, only the text content in a document is utilized to perform information discovery. However, in addition to the text content, various layout and stylistic cues in the form of titles, sections, tables, figures, and/or other elements are embedded within these documents. Exploiting these auxiliary elements can greatly assist in the process of understanding the text—especially providing useful hints on the importance and context, thereby offering an effective measure of information saliency.

Parsing the layout cues from such documents is non-trivial. There are a plethora of document formats such as PDF, DOCX, and HTML, and each of these formats requires a different type of parser, posing a scalability challenge. In addition, the information extracted by these parsers may not be consistent across different formats. For example, a border in a HTML document may be provided as multiple strokes in a PDF document, and such information must be normalized across document formats, resulting in a laborious exercise that is susceptible to error propagation.

Furthermore, in order to recognize the layouts effectively, there may be a need to train an artificial intelligence (AI) model that detects the various document elements such as table column header, table cells, footers, and figure captions. This would typically require annotated examples of these elements, which are difficult to obtain, expensive to create and even if readily available, may be subject to licensing and other usage restrictions.

Accordingly, there is a need for a mechanism to perform layout recognition and textual information retrieval from documents.

SUMMARY

The present disclosure, through one or more of its various aspects, embodiments, and/or specific features or sub-components, provides, inter alia, various systems, servers, devices, methods, media, programs, and platforms for generating synthetic documents and using machine learning algorithms that are trained with the synthetic documents to perform layout recognition and information retrieval from real-world documents.

According to an aspect of the present disclosure, a method for retrieving information from a document is provided. The method is implemented by at least one processor. The method includes: generating, by the at least one processor, a first synthetic document and at least a second synthetic document, the first synthetic document including a first plurality of elements and first annotation information that relates to the first plurality of elements, and the second synthetic document including a second plurality of elements and second annotation information that relates to the second plurality of elements; training, by the at least one processor, a machine learning algorithm that is configured to detect a layout of a real-world document by using each of the first synthetic document, the first annotation information, the second synthetic document, and the second annotation information as inputs; receiving, by the at least one processor, a first real-world document; and generating, by the at least one processor, a modified version of the first real-world document by applying the trained machine learning algorithm to the received first real-world document.

Each of the first plurality of elements and the second plurality of elements may be associated with a respective element type that includes at least one from among a header, a title, a section, a table, a cell, a drawing figure, a paragraph, a mathematical equation, a chart, and a footer.

The machine learning algorithm may implement a Bayesian network that models relationships among a plurality of random variables that includes at least one from among a font, a border, a spacing, an alignment, a color, and a content that corresponds to each of the respective element types associated with the first plurality of elements and the second plurality of elements.

Each of the plurality of random variables may have a respective distribution that includes at least one from among a Gaussian distribution, a truncated Gaussian distribution, a Cauchy distribution, a truncated Cauchy distribution, an exponential distribution, a truncated exponential distribution, a uniform distribution, a multinomial distribution, and a Dirichlet distribution.

The Bayesian network may define stochastic templates with shared distributional parameters to model a layout structure commonality among subsets of the plurality of synthetic documents.

The modified version of the first real-world document may include at least one bounding box that is superimposed over at least one corresponding element from among the first plurality of elements and at least one tag that is associated with the at least one bounding box and includes a code that identifies the respective element type of the at least one corresponding element.

The method may further include the modified version of the first real-world document on a graphical user interface (GUI).

The generating of the first synthetic document and the at least the second synthetic document may include generating a plurality of synthetic documents that includes at least 100 synthetic documents. Each of the plurality of synthetic documents may include a respective plurality of elements and corresponding annotation information that relates to the respective plurality of elements.

At least one of the plurality of synthetic documents may include at least one artificial defect from among an ink seepage defect, a watermarking defect, and a scanning bleed-through defect.

At least one of the plurality of synthetic documents may include at least one from among English-language text, Mandarin Chinese-language text, Arabic-language text, French-language text, Spanish-language text, German-language text, Portuguese-language text, and Japanese-language text.

According to another aspect of the present disclosure, a computing apparatus for retrieving information from a document is provided. The computing apparatus includes a processor; a memory; a display; and a communication interface coupled to each of the processor, the memory, and the display. The processor is configured to: generate a first synthetic document and at least a second synthetic document, the first synthetic document including a first plurality of elements and first annotation information that relates to the first plurality of elements, and the second synthetic document including a second plurality of elements and second annotation information that relates to the second plurality of elements; train a machine learning algorithm that is configured to detect a layout of a real-world document by using each of the first synthetic document, the first annotation information, the second synthetic document, and the second annotation information as inputs; receive, via the communication interface, a first real-world document; and generate a modified version of the first real-world document by applying the trained machine learning algorithm to the received first real-world document.

Each of the first plurality of elements and the second plurality of elements may be associated with a respective element type that includes at least one from among a header, a title, a section, a table, a cell, a drawing figure, a paragraph, a mathematical equation, a chart, and a footer.

The machine learning algorithm may be configured to implement a Bayesian network that models relationships among a plurality of random variables that includes at least one from among a font, a border, a spacing, an alignment, a color, and a content that corresponds to each of the respective element types associated with the first plurality of elements and the second plurality of elements.

Each of the plurality of random variables may have a respective distribution that includes at least one from among a Gaussian distribution, a truncated Gaussian distribution, a Cauchy distribution, a truncated Cauchy distribution, an exponential distribution, a truncated exponential distribution, a uniform distribution, a multinomial distribution, and a Dirichlet distribution.

The Bayesian network may define stochastic templates with shared distributional parameters to model a layout structure commonality among subsets of the plurality of synthetic documents.

The modified version of the first real-world document may include at least one bounding box that is superimposed over at least one corresponding element from among the first plurality of elements and at least one tag that is associated with the at least one bounding box and includes a code that identifies the respective element type of the at least one corresponding element.

The processor may be further configured to display, on the display, the modified version of the first real-world document on a graphical user interface (GUI).

The processor may be further configured to: generate a plurality of synthetic documents that includes at least 100 synthetic documents. Each of the plurality of synthetic documents may include a respective plurality of elements and corresponding annotation information that relates to the respective plurality of elements.

The Bayesian network may define stochastic templates with shared distributional parameters to model a layout structure commonality among subsets of the plurality of synthetic documents.

At least one of the plurality of synthetic documents may include at least one artificial defect from among an ink seepage defect, a watermarking defect, and a scanning bleed-through defect.

At least one of the plurality of synthetic documents may include at least one from among English-language text, Mandarin Chinese-language text, Arabic-language text, French-language text, Spanish-language text, German-language text, Portuguese-language text, and Japanese-language text.

According to yet another aspect of the present disclosure, a non-transitory computer readable storage medium storing instructions for retrieving information from a document is provided. The storage medium includes executable code which, when executed by a processor, causes the processor to: generate a first synthetic document and at least a second synthetic document, the first synthetic document including a first plurality of elements and first annotation information that relates to the first plurality of elements, and the second synthetic document including a second plurality of elements and second annotation information that relates to the second plurality of elements; train a machine learning algorithm that is configured to detect a layout of a real-world document by using each of the first synthetic document, the first annotation information, the second synthetic document, and the second annotation information as inputs; receive a first real-world document; and generate a modified version of the first real-world document by applying the trained machine learning algorithm to the received first real-world document.

Each of the first plurality of elements and the second plurality of elements may be associated with a respective element type that includes at least one from among a header, a title, a section, a table, a cell, a drawing figure, a paragraph, a mathematical equation, a chart, and a footer.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 7A and 7B are examples of synthetic documents that may be generated by implementing a method for performing layout recognition and information retrieval from real-world documents, according to an exemplary embodiment.

FIGS. 8A, 8B, and 8C are examples of noisy synthetic documents that simulate defects and that may be generated by implementing a method for performing layout recognition and information retrieval from real-world documents, according to an exemplary embodiment.

FIGS. 9A, 9B, and 9C are examples of multi-lingual synthetic documents that may be generated by implementing a method for performing layout recognition and information retrieval from real-world documents, according to an exemplary embodiment.

FIGS. 10A and 10B are examples of layout detection results on real-world documents that may be generated by implementing a method for performing layout recognition and information retrieval from real-world documents, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
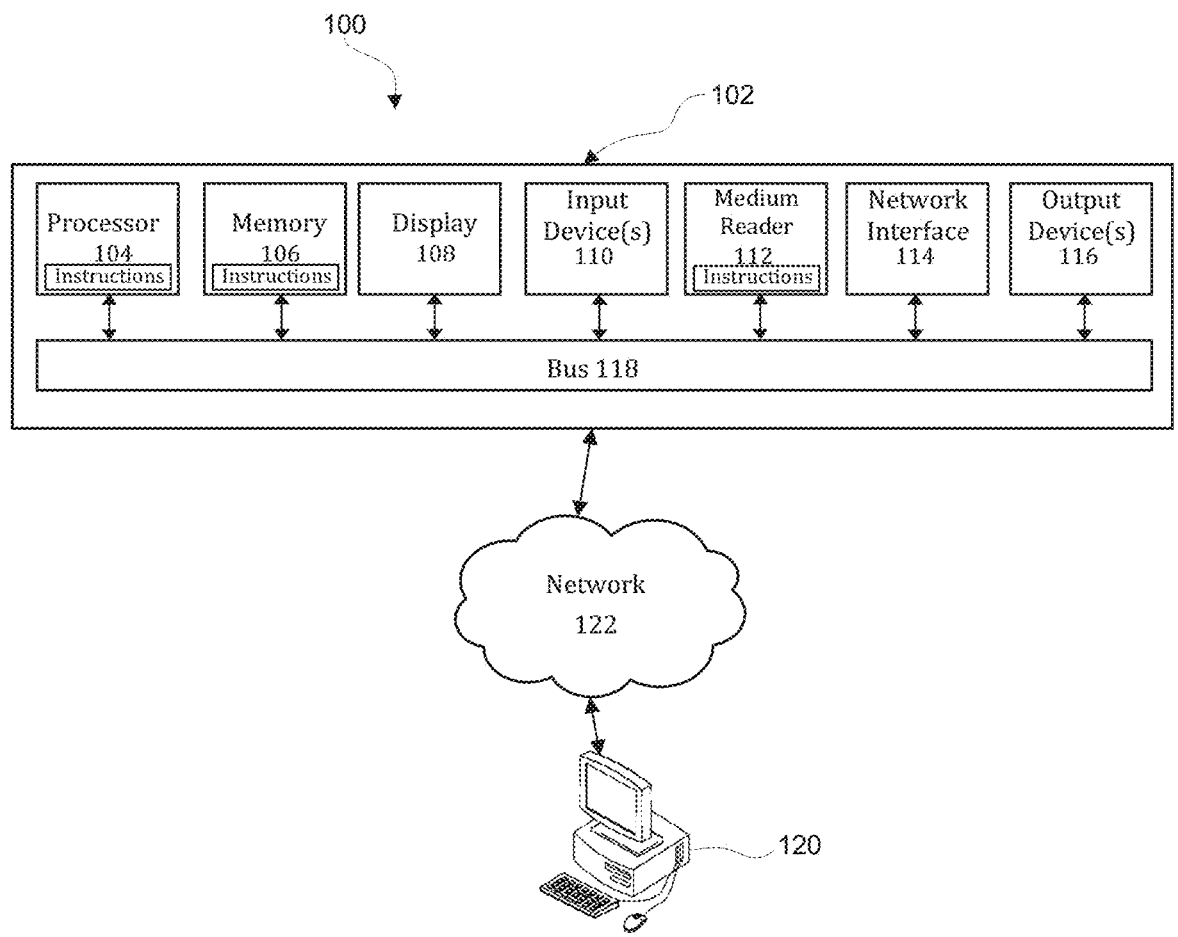
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating synthetic documents and using machine learning algorithms that are trained with the synthetic documents to perform layout recognition and information retrieval from real-world documents.

Figure 2:
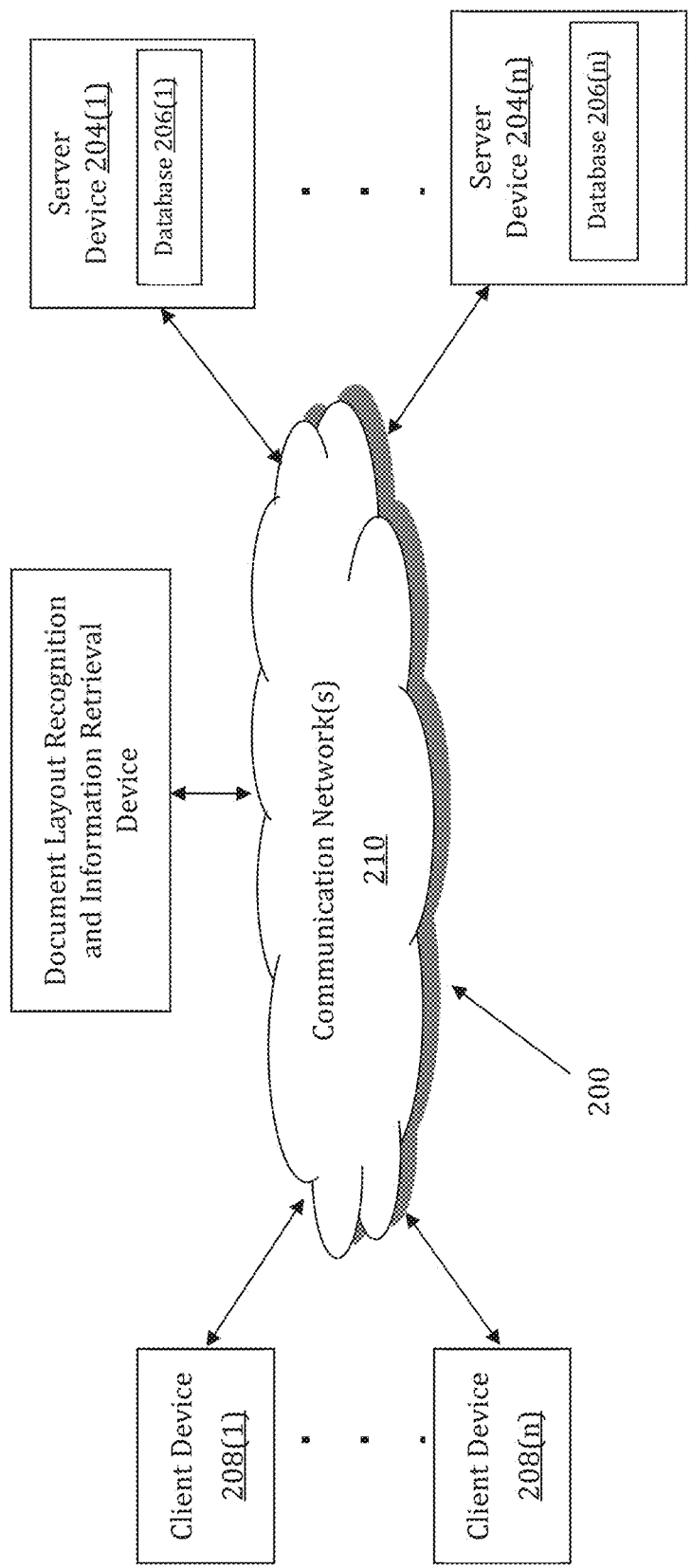
FIG. 2 illustrates an exemplary diagram of a network environment.

Referring to FIG. 2, a schematic of an exemplary network environment 200 for implementing a method for generating synthetic documents and using machine learning algorithms that are trained with the synthetic documents to perform layout recognition and information retrieval from real-world documents is illustrated. In an exemplary embodiment, the method is executable on any networked computer platform, such as, for example, a personal computer (PC).

The method for generating synthetic documents and using machine learning algorithms that are trained with the synthetic documents to perform layout recognition and information retrieval from real-world documents may be implemented by a Document Layout Recognition and Information Retrieval (DLRIR) device 202. The DLRIR device 202 may be the same or similar to the computer system 102 as described with respect to FIG. 1. The DLRIR device 202 may store one or more applications that can include executable instructions that, when executed by the DLRIR device 202, cause the DLRIR device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DLRIR device 202 itself, may be located in virtual server(s) running in a cloud-based computing environment rather than being tied to one or more specific physical network computing devices. Also, the application(s) may be running in one or more virtual machines (VMs) executing on the DLRIR device 202. Additionally, in one or more embodiments of this technology, virtual machine(s) running on the DLRIR device 202 may be managed or supervised by a hypervisor.

In the network environment 200 of FIG. 2, the DLRIR device 202 is coupled to a plurality of server devices 204(1)-204(n) that hosts a plurality of databases 206(1)-206(n), and also to a plurality of client devices 208(1)-208(n) via communication network(s) 210. A communication interface of the DLRIR device 202, such as the network interface 114 of the computer system 102 of FIG. 1, operatively couples and communicates between the DLRIR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DLRIR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DLRIR devices that efficiently implement a method for generating synthetic documents and using machine learning algorithms that are trained with the synthetic documents to perform layout recognition and information retrieval from real-world documents.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DLRIR device 202 may be a standalone device or integrated with one or more other devices or apparatuses, such as one or more of the server devices 204(1)-204(n), for example. In one particular example, the DLRIR device 202 may include or be hosted by one of the server devices 204(1)-204(n), and other arrangements are also possible. Moreover, one or more of the devices of the DLRIR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DLRIR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to synthetic document layouts and elements and data that relates to real-world documents.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DLRIR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DLRIR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DLRIR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DLRIR device 202, the server devices 204(1)-204(n), or the client devices 208(1)-208(n), for example, may be configured to operate as virtual instances on the same physical machine. In other words, one or more of the DLRIR device 202, the server devices 204(1)-204(n), or the client devices 208(1)-208(n) may operate on the same physical device rather than as separate devices communicating through communication network(s) 210. Additionally, there may be more or fewer DLRIR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
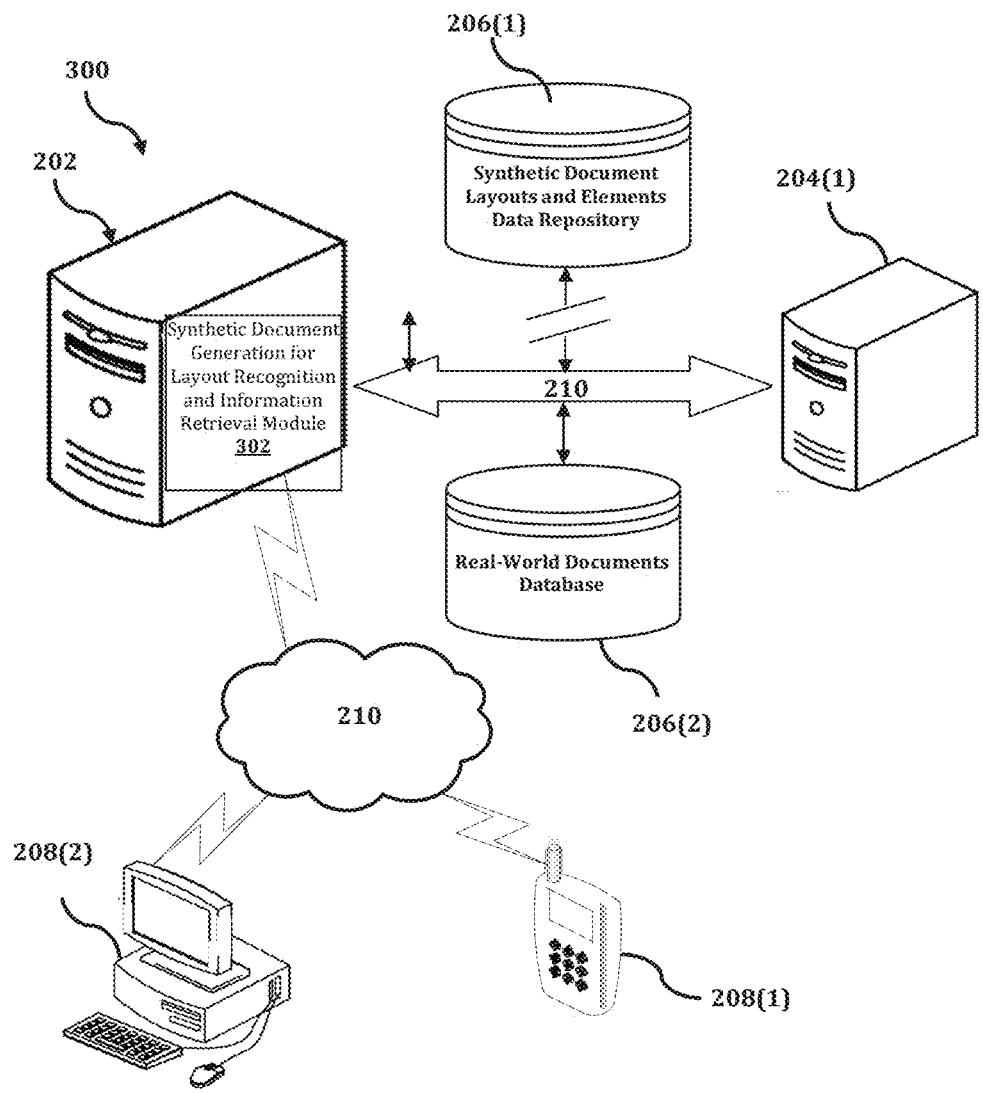
FIG. 3 shows an exemplary system for implementing a method for generating synthetic documents and using machine learning algorithms that are trained with the synthetic documents to perform layout recognition and information retrieval from real-world documents.

The DLRIR device 202 is described and illustrated in FIG. 3 as including a synthetic document generation for layout recognition and information retrieval module 302, although it may include other rules, policies, modules, databases, or applications, for example. As will be described below, the synthetic document generation for layout recognition and information retrieval module 302 is configured to implement a method for generating synthetic documents and using machine learning algorithms that are trained with the synthetic documents to perform layout recognition and information retrieval from real-world documents.

An exemplary process 300 for implementing a mechanism for generating synthetic documents and using machine learning algorithms that are trained with the synthetic documents to perform layout recognition and information retrieval from real-world documents by utilizing the network environment of FIG. 2 is illustrated as being executed in FIG. 3. Specifically, a first client device 208(1) and a second client device 208(2) are illustrated as being in communication with DLRIR device 202. In this regard, the first client device 208(1) and the second client device 208(2) may be "clients" of the DLRIR device 202 and are described herein as such. Nevertheless, it is to be known and understood that the first client device 208(1) and/or the second client device 208(2) need not necessarily be "clients" of the DLRIR device 202, or any entity described in association therewith herein. Any additional or alternative relationship may exist between either or both of the first client device 208(1) and the second client device 208(2) and the DLRIR device 202, or no relationship may exist.

Further, DLRIR device 202 is illustrated as being able to access a synthetic document layouts and elements data repository 206(1) and a real-world documents database 206(2). The synthetic document generation for layout recognition and information retrieval module 302 may be configured to access these databases for implementing a method for generating synthetic documents and using machine learning algorithms that are trained with the synthetic documents to perform layout recognition and information retrieval from real-world documents.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DLRIR device 202 via broadband or cellular communication. Of course, these embodiments are merely exemplary and are not limiting or exhaustive.

Upon being started, the synthetic document generation for layout recognition and information retrieval module 302 executes a process for generating synthetic documents and using machine learning algorithms that are trained with the synthetic documents to perform layout recognition and information retrieval from real-world documents. An exemplary process for generating synthetic documents and using machine learning algorithms that are trained with the synthetic documents to perform layout recognition and information retrieval from real-world documents is generally indicated at flowchart 400 in FIG. 4.

Figure 4:
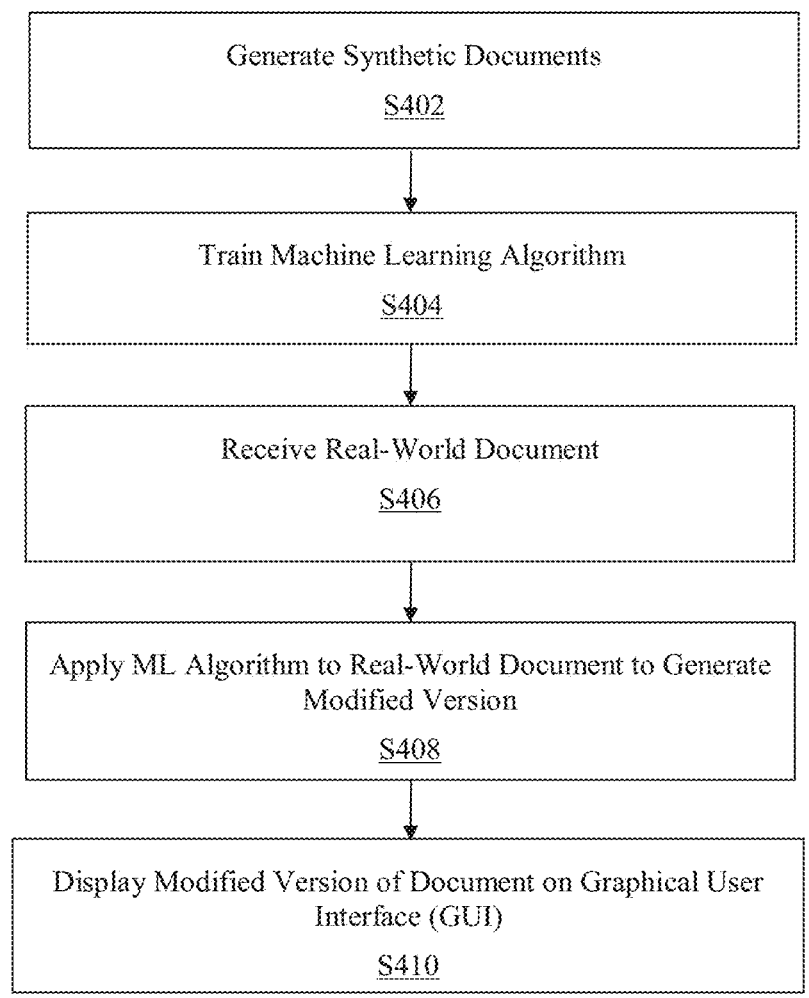
FIG. 4 is a flowchart of an exemplary process for implementing a method for generating synthetic documents and using machine learning algorithms that are trained with the synthetic documents to perform layout recognition and information retrieval from real-world documents.

In process 400 of FIG. 4, at step S402, the synthetic document generation for layout recognition and information retrieval module 302 generates synthetic documents. In an exemplary embodiment, the synthetic documents are to be used for training a machine learning algorithm that is configured to detect layouts of documents, and as such, the number of synthetic documents to be generated may be relatively large, such as, for example, at least one hundred (100). The number of synthetic documents may be in the hundreds or thousands.

In an exemplary embodiment, the synthetic documents that are generated in step S402 include a wide variety of document types. For example, the synthetic documents may include documents of several known formats that correspond to reports that are generally used in commercial activity. The synthetic documents may also include noisy documents that include defects that correspond to physical degradation, such as, for example, documents that include ink seepage defects, documents that include watermarking defects, and documents that include scanning bleed-through defects. The synthetic documents may also include documents that contain text of many different languages, such as, for example, English-language text, Mandarin Chinese-language text, Arabic-language text, French-language text, Spanish-language text, German-language text, Portuguese-language text, and/or Japanese-language text. In an exemplary embodiment, the synthetic documents may include multi-lingual text of any language.

In an exemplary embodiment, each of the synthetic documents that are generated in step S402 includes a respective set of elements and annotation information that corresponds to each element. The elements may be associated with element types that include any one or more of a header, a title, a section, a table, a cell, a drawing figure, a paragraph, a mathematical equation, a chart, and/or a footer. In an exemplary embodiment, the generation of the synthetic documents is performed by using a generation algorithm that implements a Bayesian network that models relationships among a set of random variables that include any one or more of a font, a border, a spacing, an alignment, a color, and a content that correspond to each of the respective element types. In an exemplary embodiment, each of the random variables may have a respective distribution that corresponds to one or more of a Gaussian distribution, a truncated Gaussian distribution, a Cauchy distribution, a truncated Cauchy distribution, an exponential distribution, a truncated exponential distribution, a uniform distribution, a multinomial distribution, and a Dirichlet distribution. In an exemplary embodiment, the Bayesian network defines stochastic templates with shared distributional parameters to model the commonality in layout structure between subsets of synthetic documents.

At step S404, the synthetic document generation for layout recognition and information retrieval module 302 trains a second machine learning algorithm that is configured to detect a layout of a real-world document by using the synthetic documents and the annotation information as inputs.

At step S406, the synthetic document generation for layout recognition and information retrieval module 302 receives a real-world document. Then, at step S408, the synthetic document generation for layout recognition and information retrieval module 302 applies the machine learning algorithm that was trained in step S404 to the real-world document in order to generate a modified version of the real-world document. In an exemplary embodiment, the modified version of the real-world document includes bounding boxes and tags. The bounding boxes are superimposed over various elements that have been detected within the document, and the tags are associated with the bounding boxes and include codes that identify the corresponding element types.

At step S410, the synthetic document generation for layout recognition and information retrieval module 302 displays the modified version of the real-world document on a graphical user interface (GUI).

In an exemplary embodiment, instead of employing traditional document parsing techniques that are prone to inconsistencies and tedious to scale, a Computer Vision based solution is implemented to identify the layout elements in a document. The documents are formulated in an integrated visual space, where they are treated uniformly as a rasterized image. This can scale well immediately to different document formats. The transformation to image space also allows exploiting the full-spectrum of stylistic cues such as spacing between the lines and paragraphs, which are otherwise not available in most document formats.

Effective recognition of layout elements typically require annotated examples of these layouts from multiple documents. In an exemplary embodiment, this expensive annotation process is avoided, in favor of a novel method that auto-generates these labels. In particular, a new synthetic generator model that creates artificial documents with the required labels and bounding boxes is disclosed. The generator model, which, in an exemplary embodiment, is based on a Bayesian Network, offers full-flexibility in controlling the document types and labels and can even introduce artificial defects to synthesize low-quality documents.

Figure 5A:
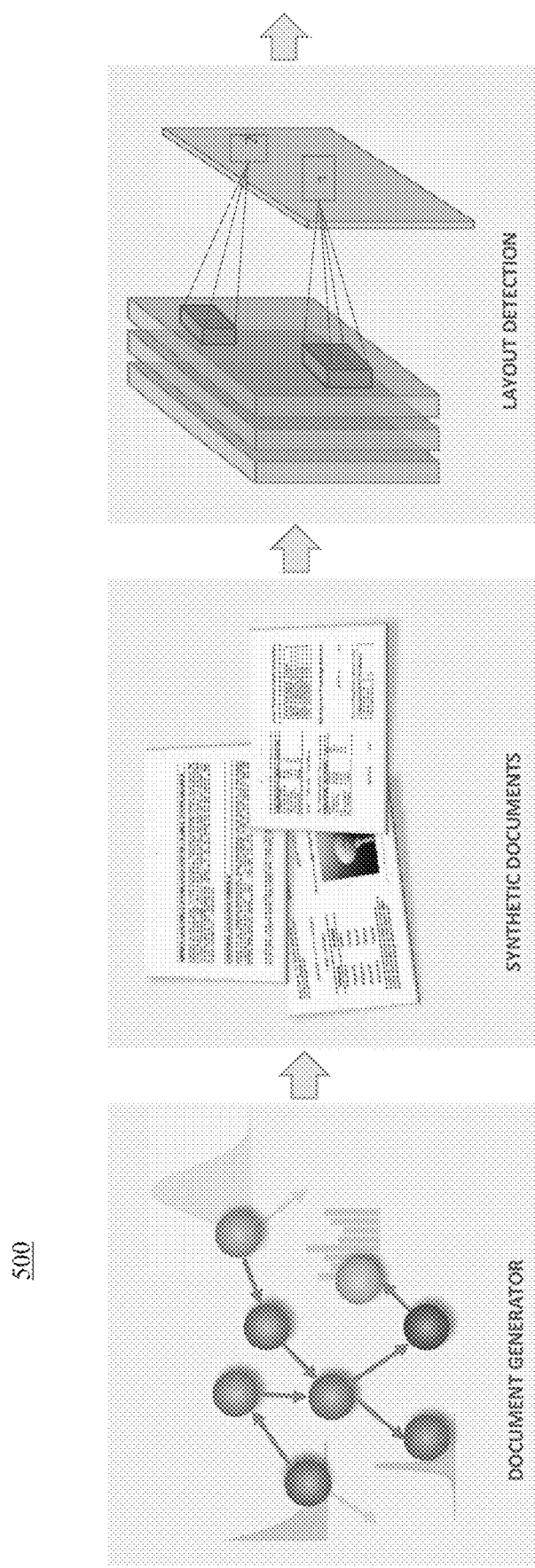
FIGS. 5A and 5B are diagrams that illustrate an overview of a system for performing layout detection based on a synthetic document generator as part of a method for performing layout recognition and information retrieval from real-world documents, according to an exemplary embodiment.
Figure 5B:
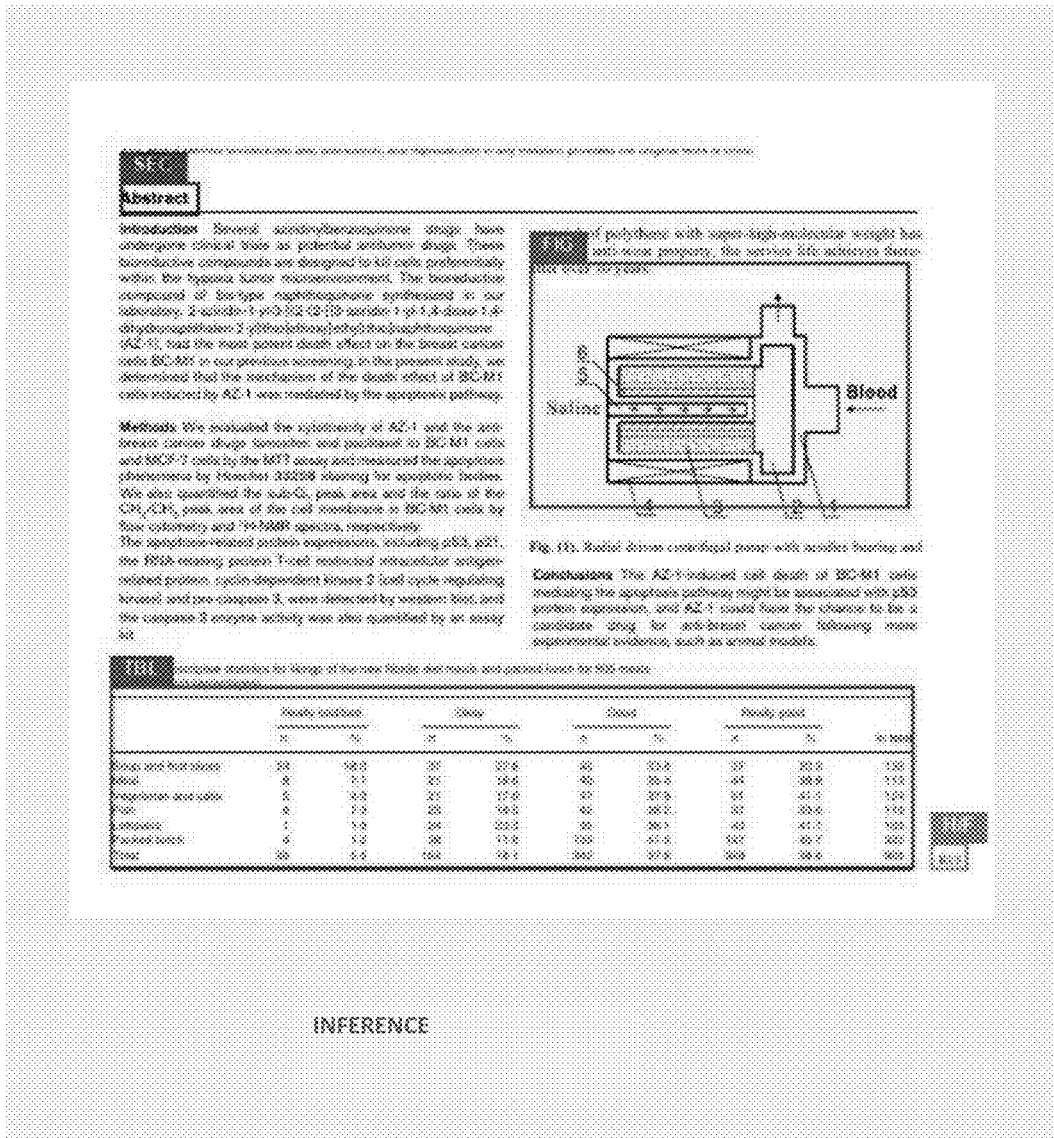

An artificial intelligence (AI) model for detecting layouts is trained purely based on these synthetic documents and the resultant model is used to identify the layout elements in real-world documents. The resulting layout elements, when augmented with the text content, greatly aids in effective information retrieval. FIGS. 5A and 5B are diagrams 500, 520 that illustrate an overview of a system for performing layout detection based on a synthetic document generator as part of a method for performing layout recognition and information retrieval from real-world documents, according to an exemplary embodiment.

Methodology: In an exemplary embodiment, the functionality of the key components is described in detail below.

Document Generator: The document generator model enables the sampling of synthetic documents. In an exemplary embodiment, the document generator defines a set of stochastic templates that represents various layout elements, such as Title, Section, Table, Figure, etc. in a document. In particular, each and every stylistic artifact that is used to construct a document is modeled as a random variable. The relationships between these variables are captured in a Bayesian Network, explicitly modeling the interactions, dependencies, causes and outcomes.

Figure 6:
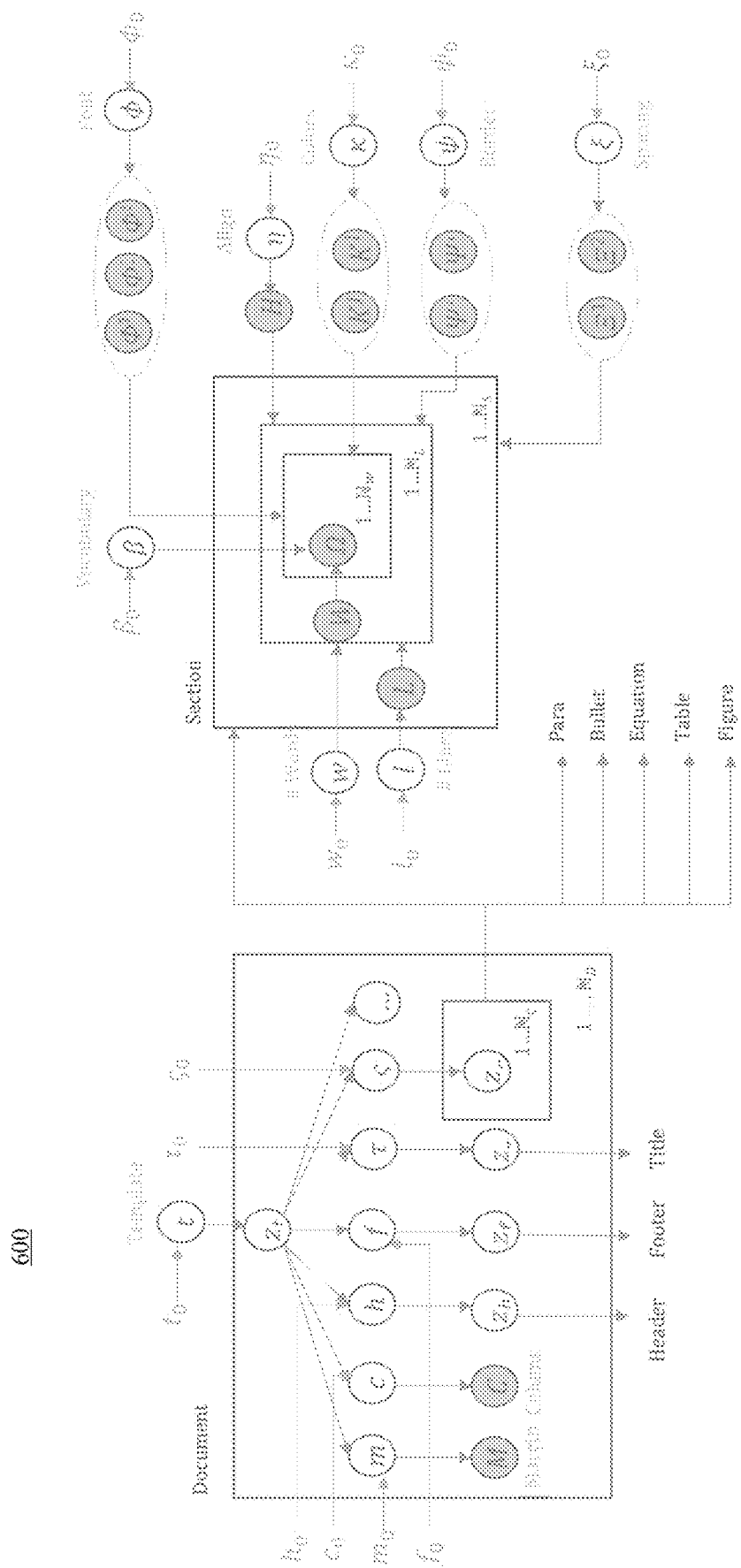
FIG. 6 is a diagram that illustrates a cross section of a Bayesian network in plate notation that corresponds to a machine learning algorithm that may be applied in an implementation of a method for performing layout recognition and information retrieval from real-world documents, according to an exemplary embodiment.

FIG. 6 is a diagram 600 that illustrates a cross-section of a Bayesian network in plate notation that corresponds to a machine learning algorithm that may be applied in an implementation of a method for performing layout recognition and information retrieval from real-world documents, according to an exemplary embodiment. The diagram 600 provides a blue-print for generating sections. Some variables are sampled for each document—for example, the margins, the number of document columns, a section font style, etc. Conversely, some variables are generated each time an element is created—for example, the number of lines in a section is sampled once for each section, and the number of words in a section line is sampled on a per-line basis.

All of the random variables are endowed with an appropriate prior distribution. The prior distributions model the information uncertainty in the causal graph structure. The variables themselves maybe discrete, continuous, bounded or unbounded. Example types of prior distributions include Gaussian, Cauchy, Exponential, Uniform, Multinomial, Dirichlet and their truncated equivalents. The prior distributions may also have hyper-prior distributions, thereby resulting in a hierarchical Bayesian model. See Table 1 below for examples of variables.

TABLE 1

Examples of Random Variables

| | |
|---|---|
| Templates | Standard, Cover, Graphic-Heavy, Scientific |
| Document | Margins, Columns, Header, Footer, Has-Logo, Has-Title, Content-Types |
| Header | Logo, Running-Text, Page |
| Content | Title, Section, Para, Bullet, Table, Equation, Figure etc. |
| Section | Font, Background, Foreground, Border, Align, Lines, Words, Spacing, Text-Case |
| Table | Width, Align, Border, Rows, Cols, Hz Pad, Vt Pad, Font, Spacing, Caption |
| Figure | Size, Natural, Chart, Caption |
| Para | Lines, Spacing |
| Chart | Rows, Columns, Plot-Type, Labels, Data |
| Font | Name, Size, Style |
| Border | Sides, Color, Fill |

The prior distributions account for a wide range of advance knowledge about the corpus of documents, from expertise to uncertainty. For example, if no useful information is known about the behavior of a random variable in advance, the prior distribution is set to be vague or weakly informative. Conversely, there may be information that is available regarding the range of values or the potential outcomes of a particular variable a-priori, in which case, a biased prior distribution that favors the desired outcome of a variable is chosen. Alternatively, if a small set of annotated data is available, the prior distributions are learned automatically, thereby reflecting a data-driven approach.

Synthetic Documents: From the generative Bayesian Network model, the various artifacts such as fonts, borders, spacing, colors, alignments, words, and other artifacts are sampled. These artifacts are used to construct an artificial document comprising the Headers, Titles, Sections, Bullets, Tables, Paras, Figures, Footers, and other elements of the documents. This results in a wide range of documents that vary in layout, style, content and composition.

Figure 7A:
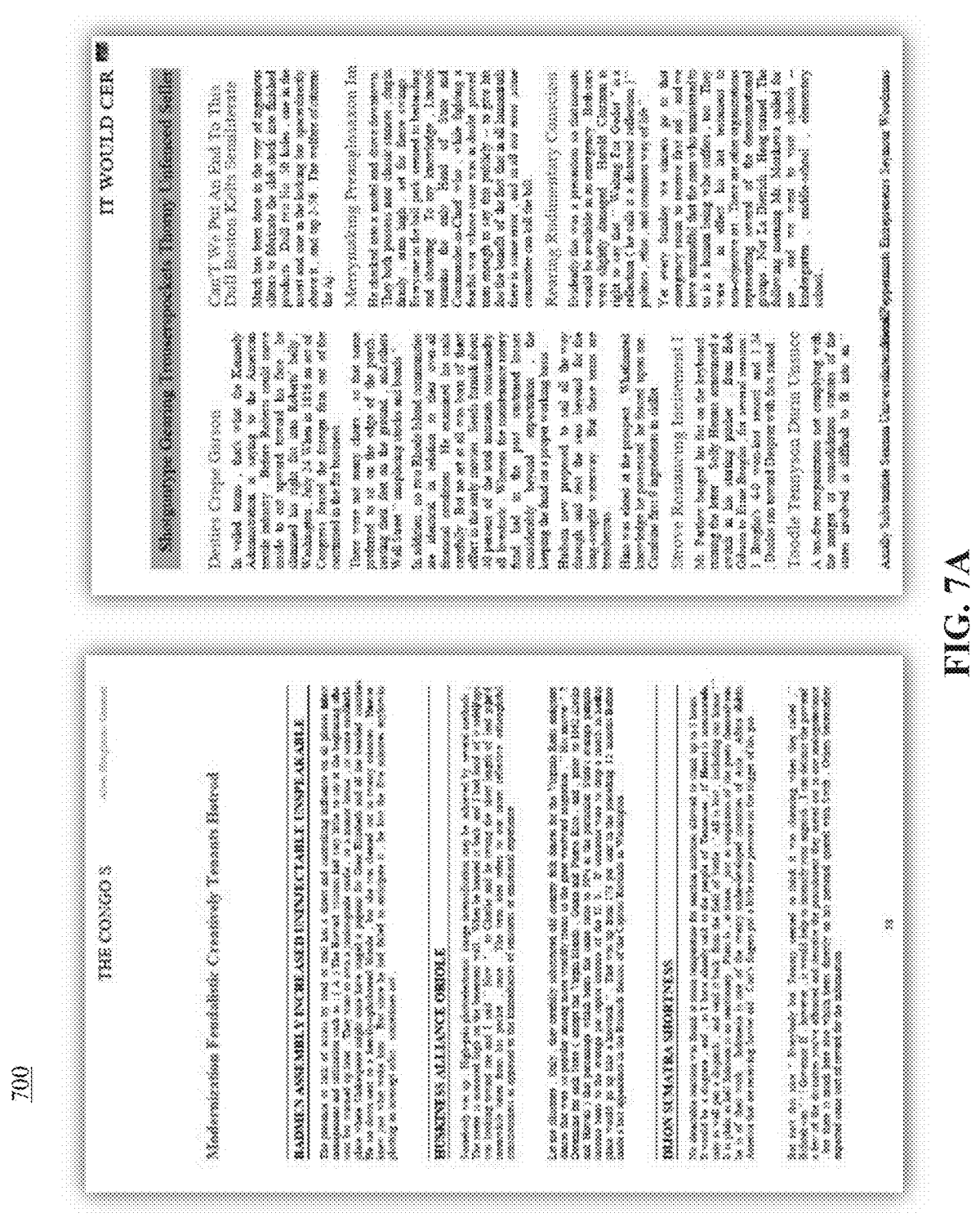
Figure 7B:
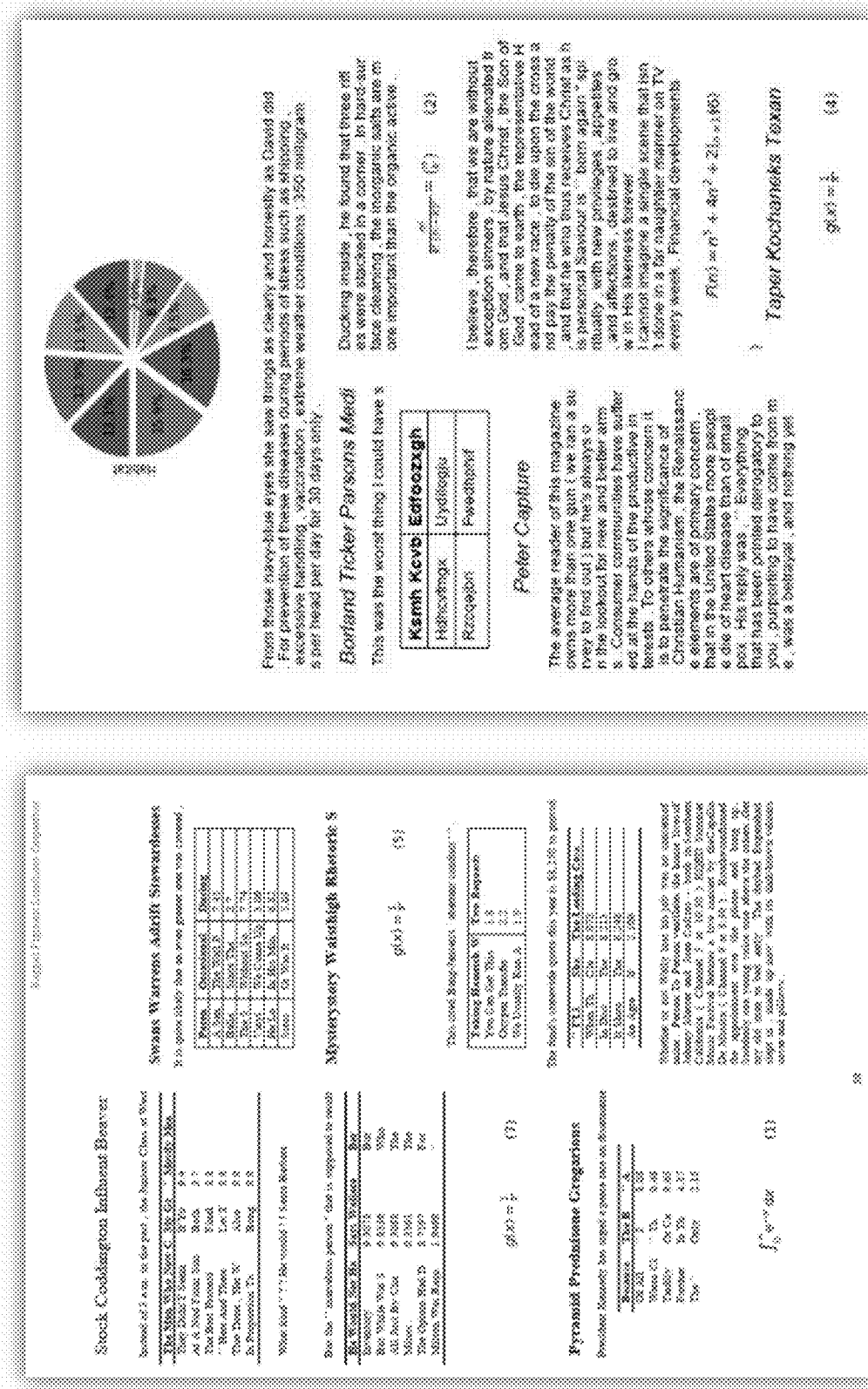
Figure 8C:
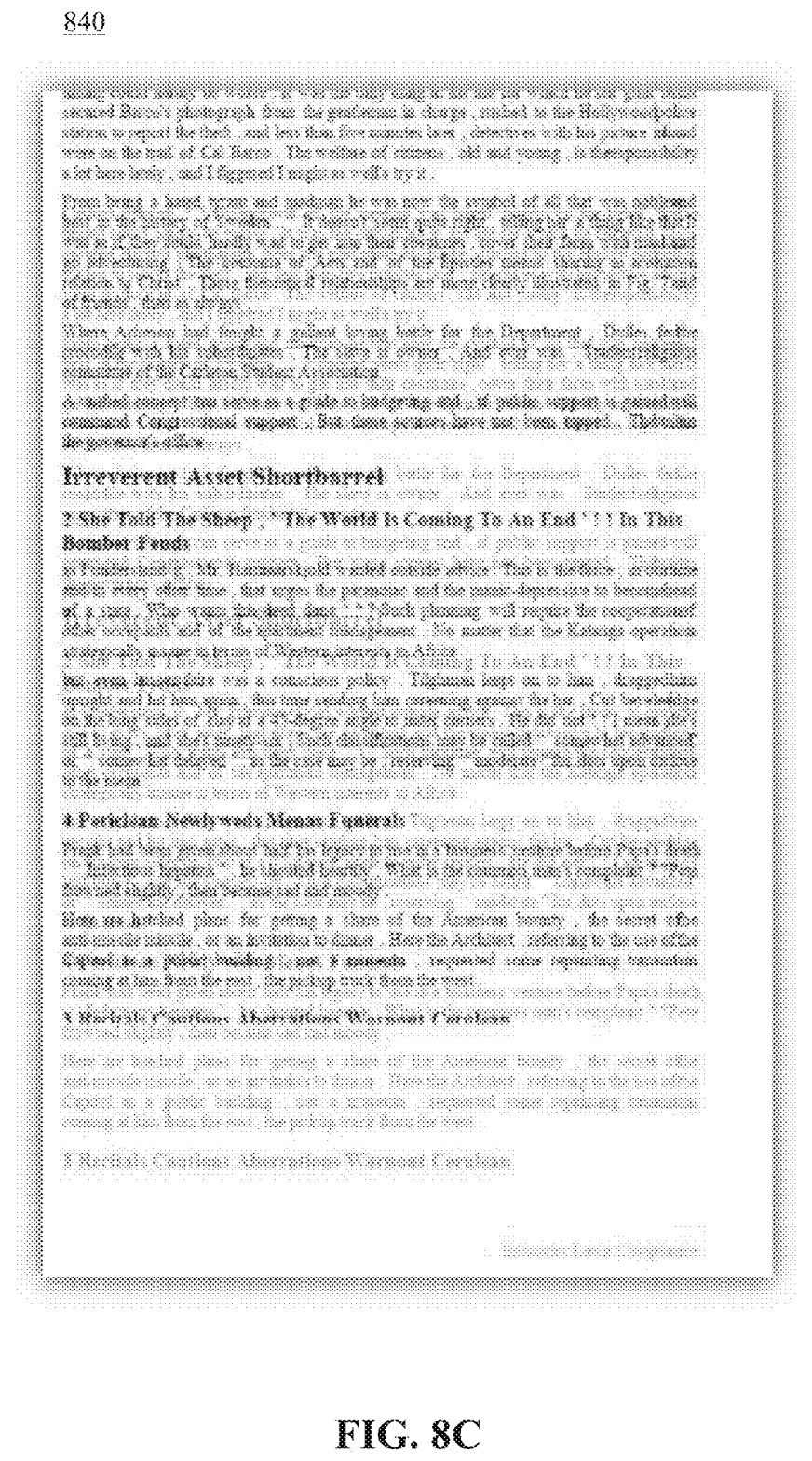
Figure 9A:
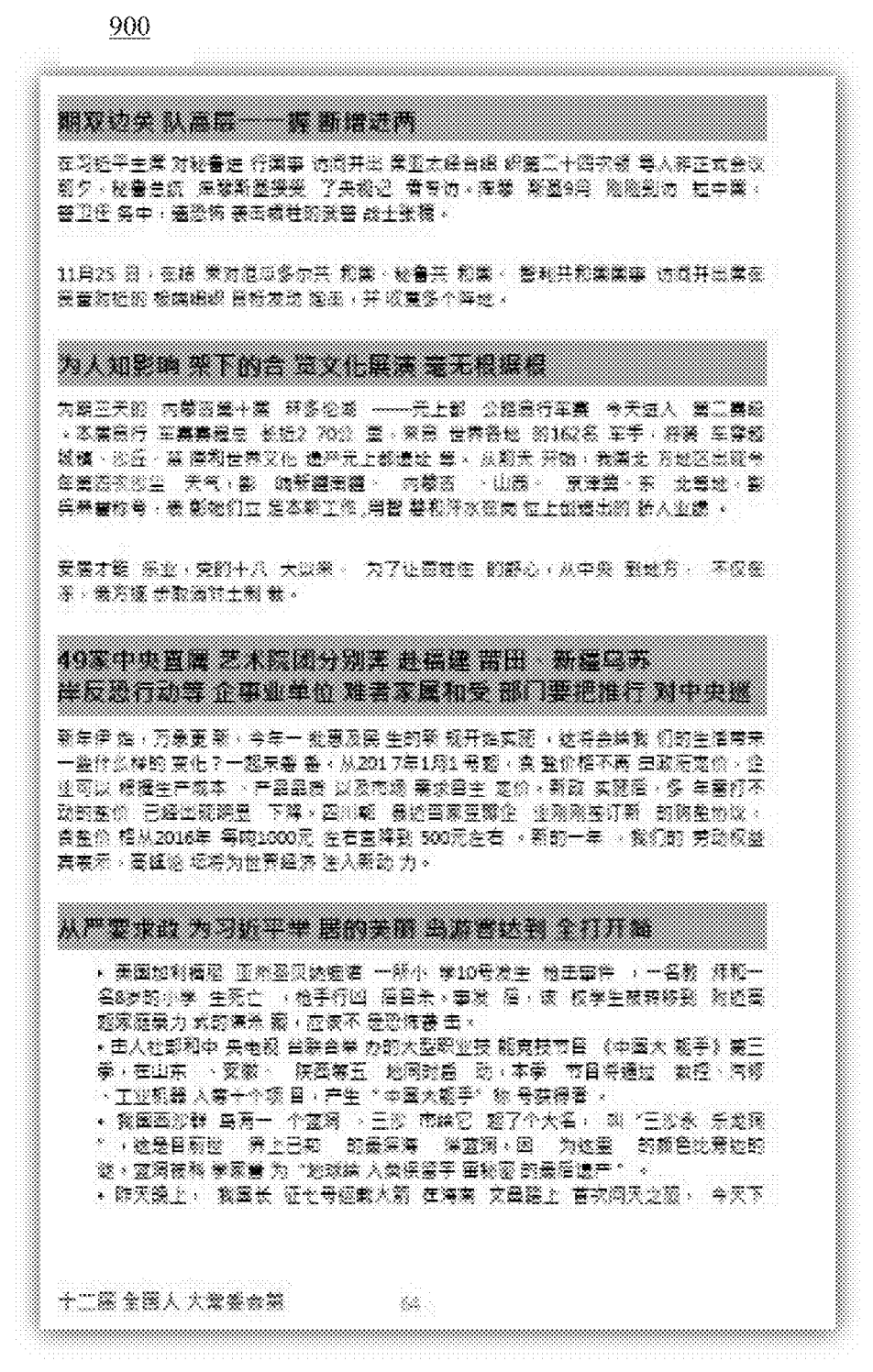
Figure 9B:
Figure 9C:
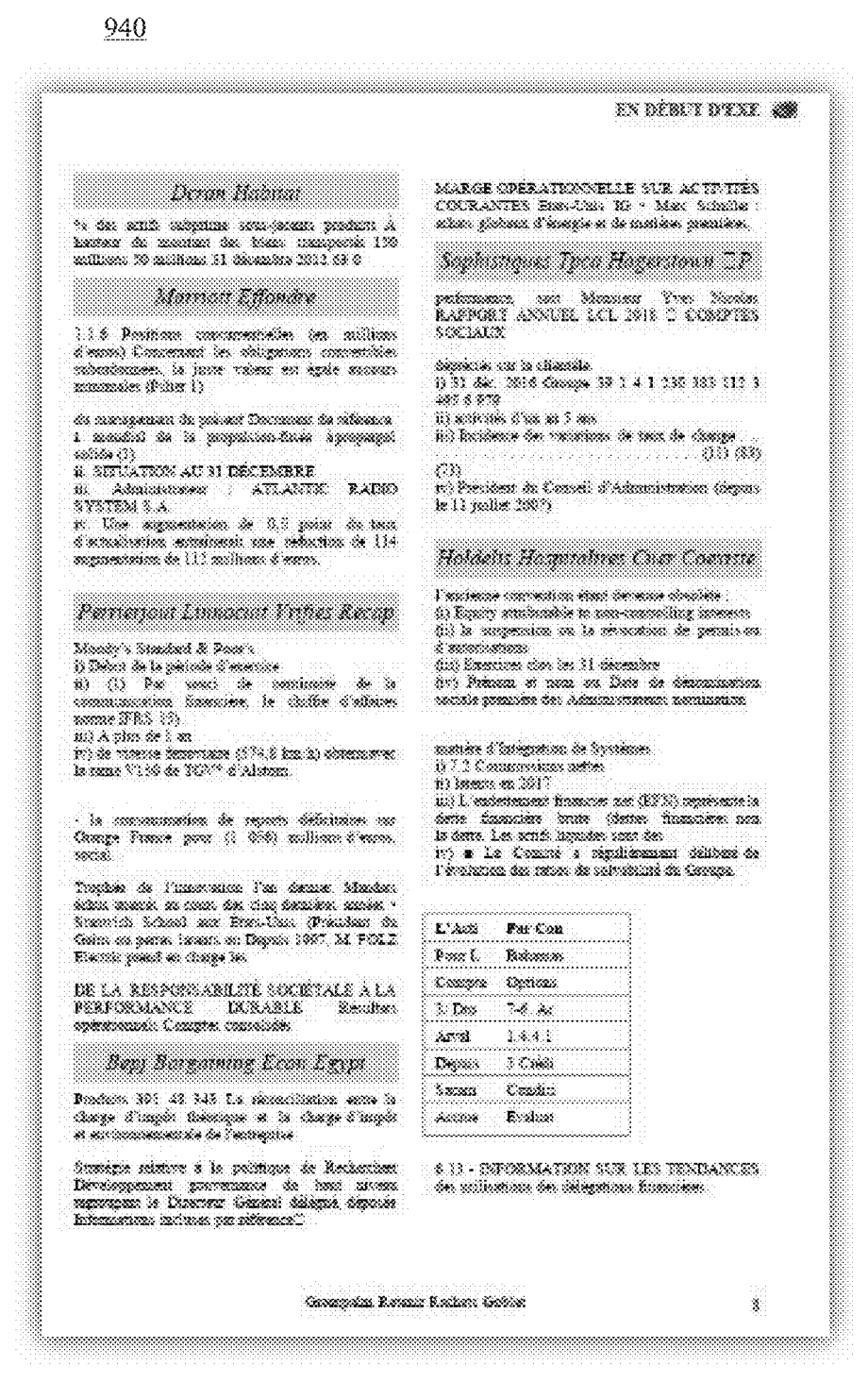

FIGS. 7A and 7B are examples 700, 720 of synthetic documents that may be generated by implementing a method for performing layout recognition and information retrieval from real-world documents, according to an exemplary embodiment. FIGS. 8A, 8B, and 8C are examples 800, 820, 840 of noisy synthetic documents that simulate defects and that may be generated by implementing a method for performing layout recognition and information retrieval from real-world documents, according to an exemplary embodiment. FIGS. 9A, 9B, and 9C are examples 900, 920, 940 of multi-lingual synthetic documents that may be generated by implementing a method for performing layout recognition and information retrieval from real-world documents, according to an exemplary embodiment.

In an exemplary embodiment, the generator allows the injection of artificial defects into the synthetic documents. Real-world documents may contain defects due to scanning errors, physical degradation and ink-seepage. By producing synthetic documents that reflect these real-world defects, the layout recognition is made robust to errors. For example, referring to FIGS. 8A, 8B, and 8C, synthetic document 800 contains defects due to corner errors and ink seepage; synthetic document 820 contains defects due to digital watermarking; and synthetic document 840 contains defects due to a back page content bleeding through.

In an exemplary embodiment, the generator also supports multi-lingual documents. Training the model with documents from different languages makes the layout detection process generalize to a wide range of practical documents, thereby improving the robustness of the model. For example, referring to FIGS. 9A, 9B, and 9C, synthetic document 900 contains Mandarin Chinese-language text; synthetic document 920 contains Arabic-language text; and synthetic document 940 contains French-language text.

Layout Detection Model: In an exemplary embodiment, the layout detection is formulated as an object detection task. A backbone architecture is used to extract the features from an image, and a feature map is constructed from a feature pyramid network. This feature map is fed into either a single-stage object detector, which uses separate subnetworks for detecting the object boundaries, or a two-stage object detection, which first detects candidate regions and pools these regions to identify the object boundaries. The resulting model produces both the bounding boxes of the objects and their corresponding object class.

Figure 10A:
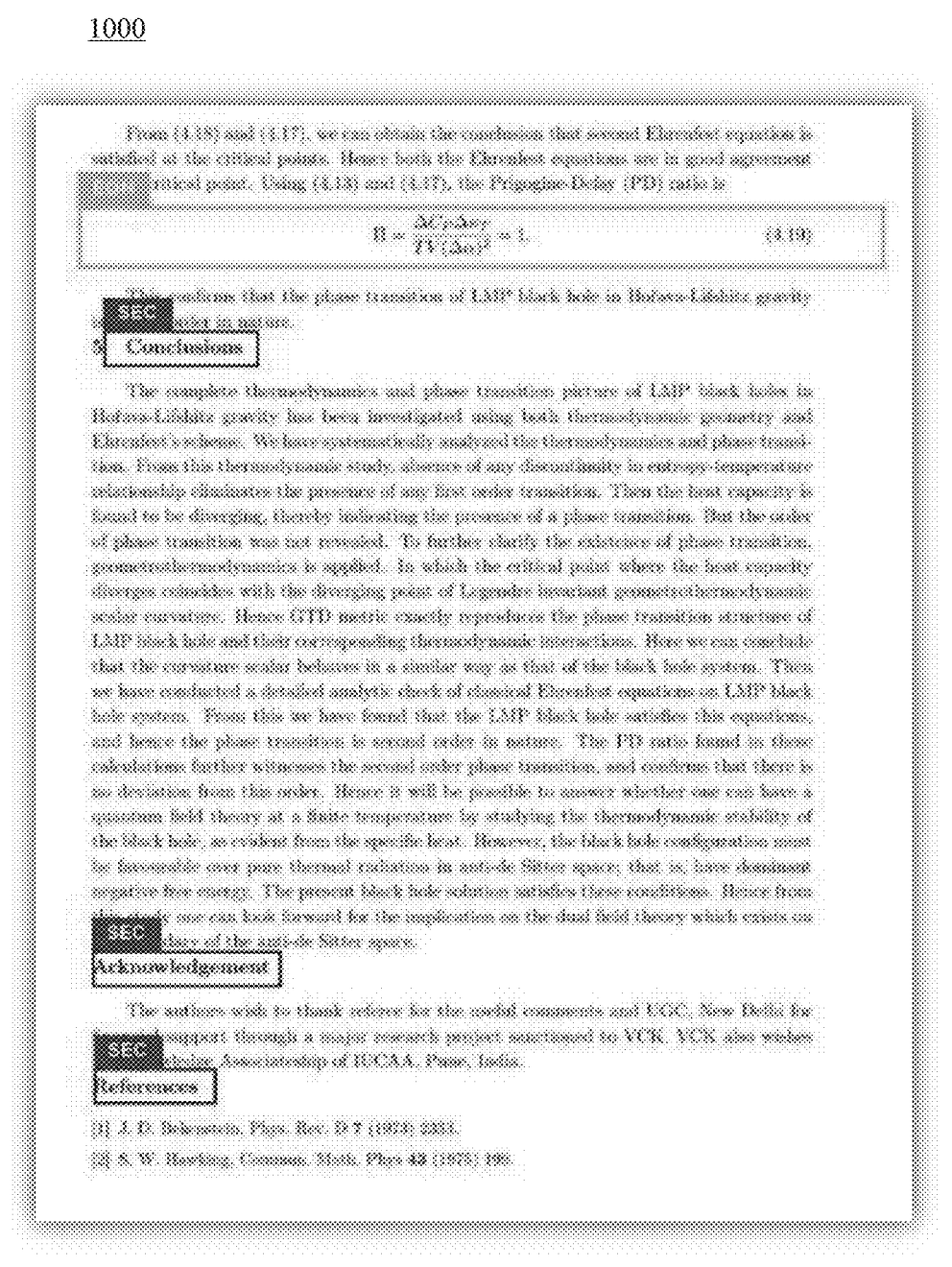
Figure 10B:
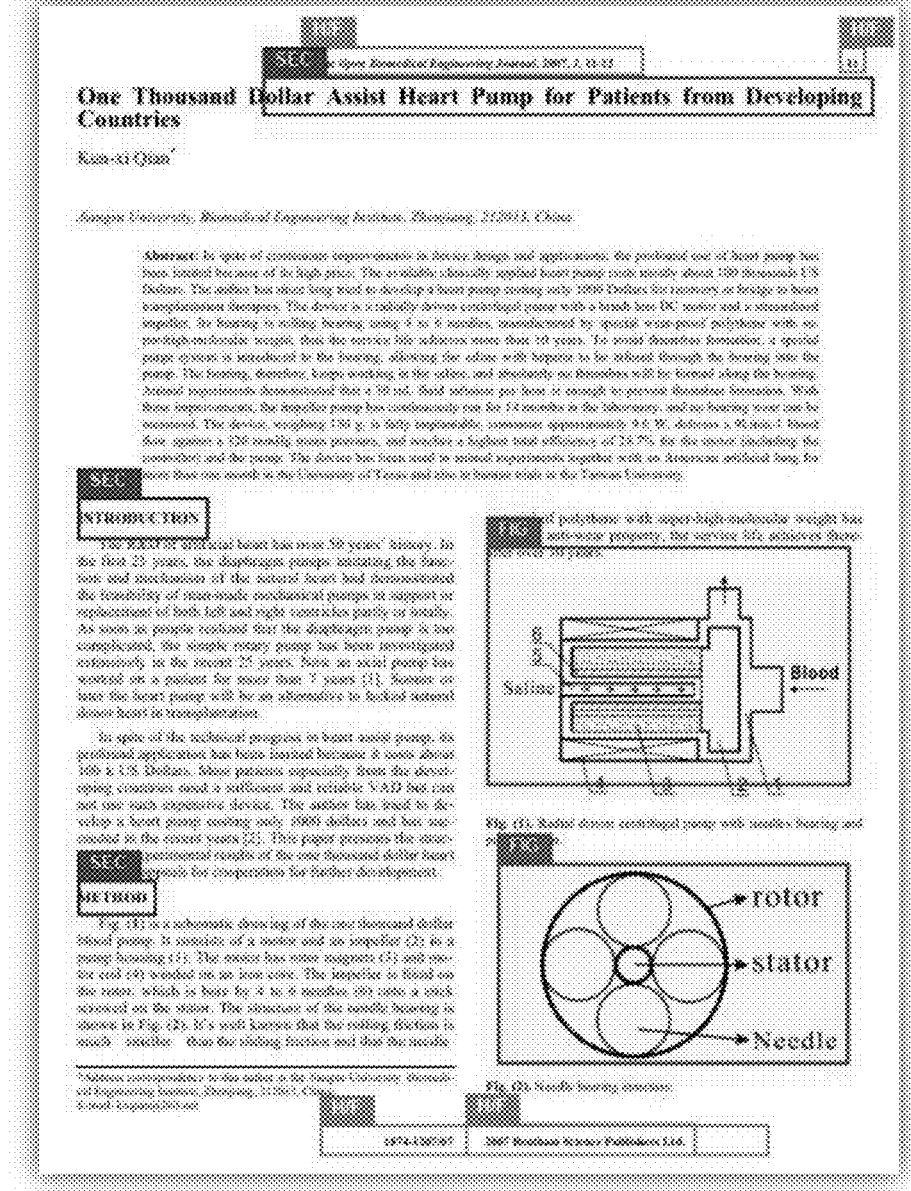

Detection Results: FIGS. 10A and 10B are examples 1000, 1020 of layout detection results on real-world documents that may be generated by implementing a method for performing layout recognition and information retrieval from real-world documents, according to an exemplary embodiment. Inference is performed on real-world documents to identify their layouts. FIGS. 10A and 10B provide examples 1000, 1020 of such layouts detected by the model. In particular, the detected layouts may include bounding boxes that are tagged with codes that identify the corresponding elements. For example, as illustrated in layout 1000, there may be bounding boxes that are tagged with "EQN" to denote a mathematical equation, or "SEC" to denote a beginning of a new section. As another example, as illustrated in layout 1020, there may be bounding boxes that are tagged with "H/F" to denote a header/footer, or "FIG" to denote a drawing figure. This layout information is finally used to score information saliency and provide additional context to the text content during information retrieval.

Key Benefits: In an exemplary embodiment, in summary, the disclosed solution offers following benefits: 1) Layout detection does not require any labels at all, because the labels are completely and automatically generated, thereby saving huge resource expenses on the annotation effort. 2) The Bayesian Network-based document generator model offers the flexibility to capture a wide range of templates, and allows both a deductive expert-system driven prior specification and a data-driven posterior inference. 3) The generated synthetic documents can be used for a wide variety of use cases, such as for augmenting data samples during training, encoding distributional semantics, enriching text context, and preserving privacy. 4) The recognition of various layout elements can benefit information discovery for a wide range of business cases.

Accordingly, with this technology, an optimized process for generating synthetic documents and using machine learning algorithms that are trained with the synthetic documents to perform layout recognition and information retrieval from real-world documents is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for retrieving information from a document, the method being implemented by at least one processor, the method comprising:
   generating, by the at least one processor, a first synthetic document and at least a second synthetic document, the first synthetic document including a first plurality of elements and first annotation information that relates to the first plurality of elements, and the second synthetic document including a second plurality of elements and second annotation information that relates to the second plurality of elements;
   training, by the at least one processor, a machine learning algorithm that is configured to detect a layout of a real-world document by using each of the first synthetic document, the first annotation information, the second synthetic document, and the second annotation information as inputs;
   receiving, by the at least one processor, a first real-world document; and
   generating, by the at least one processor, a modified version of the first real-world document by applying the trained machine learning algorithm to the received first real-world document,
   wherein each of the first plurality of elements and the second plurality of elements is associated with a respective element type that includes at least one from among a header, a title, a section, a table, a cell, a drawing figure, a paragraph, a mathematical equation, a chart, and a footer, and
   wherein the machine learning algorithm implements a Bayesian network that models relationships among a plurality of random variables that includes at least one from among a font, a border, a spacing, an alignment, a color, and a content that corresponds to each of the respective element types associated with the first plurality of elements and the second plurality of elements, and
   wherein the Bayesian network defines stochastic templates with shared distributional parameters to model at least one layout structure commonality among subsets of synthetic documents.

2. The method of claim 1, wherein each of the plurality of random variables has a respective distribution that includes at least one from among a Gaussian distribution, a truncated Gaussian distribution, a Cauchy distribution, a truncated Cauchy distribution, an exponential distribution, a truncated exponential distribution, a uniform distribution, a multinomial distribution, and a Dirichlet distribution.

3. The method of claim 1, wherein the modified version of the first real-world document includes at least one bounding box that is superimposed over at least one corresponding element from among the first plurality of elements and at least one tag that is associated with the at least one bounding box and includes a code that identifies the respective element type of the at least one corresponding element.

4. The method of claim 1, further comprising displaying the modified version of the first real-world document on a graphical user interface (GUI).

5. The method of claim 1, wherein the generating of the first synthetic document and the at least the second synthetic document comprises generating a plurality of synthetic documents that includes at least 100 synthetic documents, each of the plurality of synthetic documents including a respective plurality of elements and corresponding annotation information that relates to the respective plurality of elements.

6. The method of claim 5, wherein at least one of the plurality of synthetic documents includes at least one artificial defect from among an ink seepage defect, a watermarking defect, and a scanning bleed-through defect.

7. The method of claim 5, wherein at least one of the plurality of synthetic documents includes at least one from among English-language text, Mandarin Chinese-language text, Arabic-language text, French-language text, Spanish-language text, German-language text, Portuguese-language text, and Japanese-language text.

8. A computing apparatus for retrieving information from a document, the computing apparatus comprising:
   a processor;
   a memory;
   a display; and
   a communication interface coupled to each of the processor, the memory, and the display, wherein the processor is configured to:
      generate a first synthetic document and at least a second synthetic document, the first synthetic document including a first plurality of elements and first annotation information that relates to the first plurality of elements, and the second synthetic document including a second plurality of elements and second annotation information that relates to the second plurality of elements;
      train a machine learning algorithm that is configured to detect a layout of a real-world document by using each of the first synthetic document, the first annotation information, the second synthetic document, and the second annotation information as inputs;
      receive, via the communication interface, a first real-world document; and
      generate a modified version of the first real-world document by applying the trained machine learning algorithm to the received first real-world document,
   wherein each of the first plurality of elements and the second plurality of elements is associated with a respective element type that includes at least one from among a header, a title, a section, a table, a cell, a drawing figure, a paragraph, a mathematical equation, a chart, and a footer, and
   wherein the machine learning algorithm is configured to implement a Bayesian network that models relationships among a plurality of random variables that includes at least one from among a font, a border, a spacing, an alignment, a color, and a content that corresponds to each of the respective element types associated with the first plurality of elements and the second plurality of elements, and
   wherein the Bayesian network defines stochastic templates with shared distributional parameters to model at least one layout structure commonality among subsets of synthetic documents.

9. The computing apparatus of claim 8, wherein each of the plurality of random variables has a respective distribution that includes at least one from among a Gaussian distribution, a truncated Gaussian distribution, a Cauchy distribution, a truncated Cauchy distribution, an exponential distribution, a truncated exponential distribution, a uniform distribution, a multinomial distribution, and a Dirichlet distribution.

10. The computing apparatus of claim 8, wherein the modified version of the first real-world document includes at least one bounding box that is superimposed over at least one corresponding element from among the first plurality of elements and at least one tag that is associated with the at least one bounding box and includes a code that identifies the respective element type of the at least one corresponding element.

11. The computing apparatus of claim 8, wherein the processor is further configured to display, on the display, the modified version of the first real-world document on a graphical user interface (GUI).

12. The computing apparatus of claim 8, wherein the processor is further configured to:
   generate a plurality of synthetic documents that includes at least 100 synthetic documents, each of the plurality of synthetic documents including a respective plurality of elements and corresponding annotation information that relates to the respective plurality of elements.

13. The computing apparatus of claim 12, wherein at least one of the plurality of synthetic documents includes at least one artificial defect from among an ink seepage defect, a watermarking defect, and a scanning bleed-through defect.

14. The computing apparatus of claim 12, wherein at least one of the plurality of synthetic documents includes at least one from among English-language text, Mandarin Chinese-language text, Arabic-language text, French-language text, Spanish-language text, German-language text, Portuguese-language text, and Japanese-language text.

* * * * *